United States Patent
Dulac et al.

(10) Patent No.: US 7,295,929 B2
(45) Date of Patent: Nov. 13, 2007

(54) PROCESS, DEVICE AND SOFTWARE PACKAGE FOR LOCALLY DETERMINING THE SHAPE OF GEOLOGICAL HORIZONS

(75) Inventors: Jean-Claude Dulac, Sugarland, TX (US); Fabien Bosquet, Houston, TX (US); Emmanuel Labrunye, Nancy (FR)

(73) Assignee: Earth Decision Sciences, Vandoeuvres les Nancy (FR)

(*) Notice: Subject to any disclaimer, the term of this patent is extended or adjusted under 35 U.S.C. 154(b) by 56 days.

(21) Appl. No.: 10/518,632

(22) PCT Filed: Jun. 11, 2003

(86) PCT No.: PCT/FR03/01754

§ 371 (c)(1), (2), (4) Date: Dec. 20, 2004

(87) PCT Pub. No.: WO04/001449

PCT Pub. Date: Dec. 31, 2003

(65) Prior Publication Data

US 2006/0041383 A1    Feb. 23, 2006

(30) Foreign Application Priority Data

Jun. 19, 2002 (FR) .................................. 02 07598

(51) Int. Cl.
*G01V 1/28* (2006.01)

(52) U.S. Cl. .......................................... 702/16; 702/17
(58) Field of Classification Search .................. 702/14, 702/16, 17
See application file for complete search history.

(56) References Cited

U.S. PATENT DOCUMENTS

| | | | |
|---|---|---|---|
| 4,672,546 A | 6/1987 | Flinchbaugh | |
| 5,615,171 A | 3/1997 | Hildebrand | |
| 5,848,379 A * | 12/1998 | Bishop | ................ 702/6 |
| 5,930,730 A | 7/1999 | Kirlin et al. | |
| 6,138,076 A | 10/2000 | Graf et al. | |
| 6,151,555 A | 11/2000 | Pepper et al. | |
| 6,665,615 B2 * | 12/2003 | Van Riel et al. | ................ 702/2 |
| 2002/0022930 A1 | 2/2002 | Bouts et al. | |

* cited by examiner

*Primary Examiner*—Donald E McElheny, Jr.
(74) *Attorney, Agent, or Firm*—Young & Thompson

(57) ABSTRACT

A method for locally determining a profile of geological horizons includes a step (100) which consists in digital modeling with continuous local seismic traces, calculating an optimal offset and defining a conditional neighborhood of a reference central continuous local seismic trace; a step (101) which consists in defining residuals relative to the reference central continuous local seismic trace; a third step (102) which consists in minimizing the set of residuals on the conditional neighborhood and a fourth step (103) which consists in determining parametric coefficients corresponding to the minimization of the set of residuals on the conditional neighborhood carried out at step (102).

20 Claims, 5 Drawing Sheets

PROCESS, DEVICE AND SOFTWARE PACKAGE FOR LOCALLY DETERMINING THE SHAPE OF GEOLOGICAL HORIZONS

BACKGROUND OF THE INVENTION

The invention relates to a process for locally determining the shape of geological horizons from data obtained by processing seismic measurements.

The invention also relates to a device to determine locally the shape of geological horizons from data obtained by processing seismic measurements.

Finally, the invention relates to a computer software package permitting the operation of a programmable device according to the invention, for the practice of a process according to the invention.

U.S. Pat. No. 6,151,555 relates to a process for processing seismic signals and a device for the determination of a cube of variance value. This process provides for computing for each node of three-dimensional seismic matrix a variance value equal to the variance of the seismic amplitudes adjacent the node in question. The vicinity of the node in question is a subset of the nodes of the three-dimensional matrix whose distance to the node in question is less than a selected threshold. This process relies on the hypothesis that the variance value thus defined is important for nodes near a discontinuity.

The document WO 99/64896 discloses a process for interpretation of seismic data, particularly adapted to identify the limits of hydrocarbon reservoirs.

SUMMARY OF THE INVENTION

A first object of the invention is to improve the analyses of the profile of the geometric horizons.

A second object of the invention is to facilitate the determination of the unitary vectors normal to the horizons of a three-dimensional seismic cube.

A third object of the invention is to facilitate the determination of an index of curvature of the horizons in a three-dimensional seismic cube.

The invention has for its object a process for locally determining the shape of geological horizons, in which there is constructed a continuous function $S_{ij,k}(t)$ by interpolation or approximation of the discrete seismic traces of a three-dimensional seismic matrix, said function being designated as "continuous local seismic trace", comprising the following steps:

a). using as optimum offset of two adjacent continuous local seismic traces, the offset value rendering maximal their correlation function;

b). taking as conditional neighborhood a "central" continuous local seismic trace $S_{ij,k}(t)$, said neighborhood consisting in adjacent traces $S_{pq,k}(t)$ corresponding to optimum offsets associated with correlations $R_{ij,pq,k}(h)$ greater than a predetermined threshold comprised between 0 and 1;

c). defining for each continuous local seismic trace $S_{pq,k}(t)$ of the conditional neighborhood a residual value relative to said "central" continuous local seismic trace $S_{ij,k}(t)$ comprising parametric coefficients;

d). determining the parametric coefficients by minimizing a set of residuals on the conditional neighborhood.

According to other characteristics of the invention:

the residual values of step c) are absolute values of differential parametric shape, for example $\rho_{ij,pq,k} = |a_{ij,k} \cdot (p-i) + b_{ij,k} \cdot (q-j) - h_{ij,pq,k}|$ in which $a_{ij,k}$ and $b_{ij,k}$ are parameters and $h_{ij,pq,k}$ is the optimum offset maintained between the "central" continuous local seismic trace $S_{ij,k}(t)$ and an adjacent continuous local seismic trace $S_{pq,k}(t)$, minimizing the set of residuals $\rho_{ij,pq,k}$ on the conditional neighborhood by a minimization of a sum of powers of the residuals of the following type $$C^\alpha(i,j,k) = \sum_{p,q} (\rho_{ij,pq,k})^\alpha,$$

in which $\alpha$ is a power greater than or equal to 1,

As the case may be, each term $(\rho_{ij,pq,k})^\alpha$ of this sum can be weighted by an increasing functional factor of the correlation coefficient $P_{ij,pq,k}(h_{ij,pq,k})$.

the coefficients $a_{ij,k}$ and $b_{ij,k}$ determined in step d) are used to define a unitary vector $N(i,j,k)$ of coordinates $N^x(i,j,k)$, $N^y(i,j,k)$, $N^t(i,j,k)$, for example of the form:

$$N^x(i,j,k) = \frac{a_{ij,k}}{\sqrt{(a_{ij,k})^2 + (b_{ij,k})^2 + 1}}$$

$$N^y(i,j,k) = \frac{b_{ij,k}}{\sqrt{(a_{ij,k})^2 + (b_{ij,k})^2 + 1}}$$

$$N^t(i,j,k) = \frac{1}{\sqrt{(a_{ij,k})^2 + (b_{ij,k})^2 - 1}}$$

and there is chosen this unitary vector as a "normal" unitary vector orthogonal to the horizon at the node (i, j, k), the set of normal unitary vectors $N(i,j,k)$ is used to define the field of normal unitary vectors, for the display on a screen of the profiles of the seismic horizons, there is selected as the index of curvature an increasing function of the residuals comprising the parametric coefficients determined in step d).

The invention also has for its object a device for practicing the process according to the invention, comprising means to use as optimum offset of two adjacent continuous local seismic traces, the offset value rendering maximal their correlation function, means to take as the conditional neighborhood of a "central" continuous local seismic trace $S_{ij,k}(t)$, the sub-neighborhood consisting in adjacent traces $S_{pq,k}(t)$ corresponding to optimum offsets associated with correlations $R_{ij,pq,k}(h)$ greater than a predetermined threshold comprised between 0 and 1, means to define for each continuous local seismic trace $S_{pq,k}(t)$ of the conditional neighborhood a value of residual relative to said "central" continuous local seismic trace $S_{ij,k}(t)$ comprising parametric coefficients, and means to determine the parametric coefficients by minimization of the set of residuals on the conditional neighborhood.

According to other characteristics of the invention:

the device comprises memorization means and means for visualizing predetermined seismic parameters with the help of the process according to the invention.

The invention finally has for its object a computer software package, comprising elements of program code to execute the steps of a process according to the invention, when said program is executed by a computer.

BRIEF DESCRIPTION OF THE DRAWINGS

The invention will be better understood from the description which follows, given by way of non-limiting example, with reference to the accompanying drawings, in which.

BRIEF DESCRIPTION OF THE PREFERRED EMBODIMENTS

Figure 1:
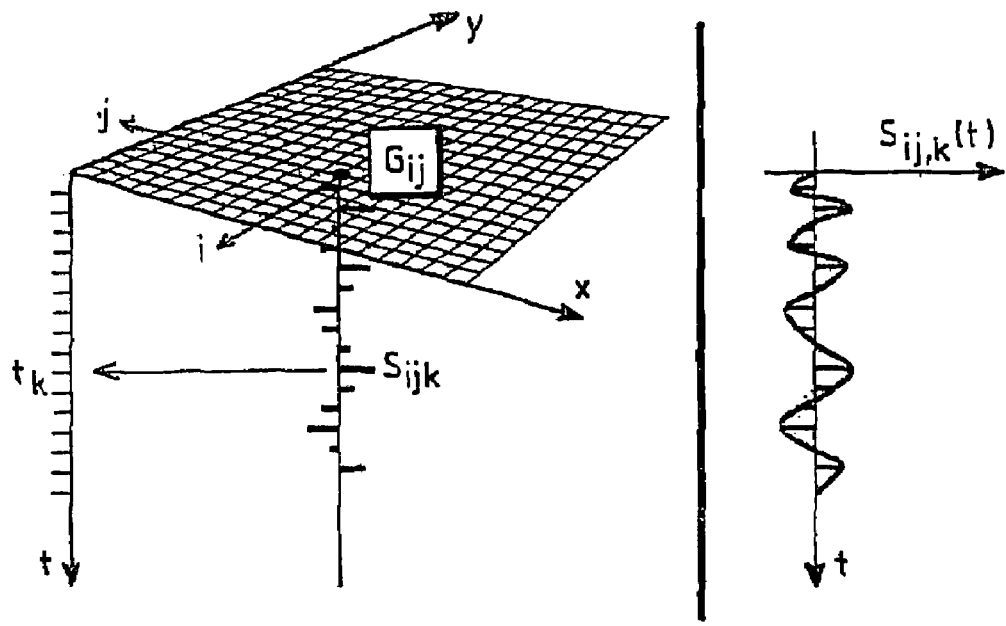
FIG. 1 represents schematically a three-dimensional seismic matrix and a continuous local seismic trace.

With reference to FIGS. 1 to 5, identical or functional equivalent elements are designated by the same reference numerals.

In FIG. 1, a three-dimensional seismic matrix is obtained by reading measurements recorded by geophones $G_{ij}$ disposed on a network x,y at coordinate points i,j. The reading of the sampled measurements time-wise is represented along a descending axis t representative of the depth or of a vertical descent from the surface of the ground or the sea. The measurements are characterized by their amplitude, for example an amplitude read by the geophone $G_{ij}$ at the time or at the sampling depth $t_k$. The discrete measurement carried out by the geophone $G_{ij}$ as to time or depth $t_k$ is called the seismic amplitude $S_{ij,k}$.

The set of seismic amplitudes corresponding to a geophone $G_{ij}$ of coordinates i,j is a uni-dimensional matrix ($S_{ij1}$, $S_{ij2}$, ..., $S_{ijk}$, ..., $S_{ijN}$) called a discrete seismic trace, because this uni-dimensional matrix corresponds to the trace according to the point of horizontal coordinates i,j of the three-dimensional seismic matrix obtained by seismic measurements.

The vertical axis t oriented along a descending vertical, usually designates time, but can also be considered as representing a depth from the surface.

The invention also relates to the application of a third coordinate t representative of time, as well as a third coordinate t representative of depth.

From the discrete seismic trace located on the vertical of a geophone $G_{ij}$ there is defined, by interpolation or approximation, discrete values about $t=t_k=k$, a continuous function $S_{ij,k}(t)$ which is designated as "continuous local seismic trace". The methods of approximation or interpolation of discrete values to give rise to a continuous function are numerous, and comprise particularly polynomial interpolations or approximations, as well as polynomial trigonometric approximations or interpolations.

Any other modification of interpolation or approximation providing a continuous function can also be used in the present invention to provide a "continuous local seismic trace".

Figure 2:
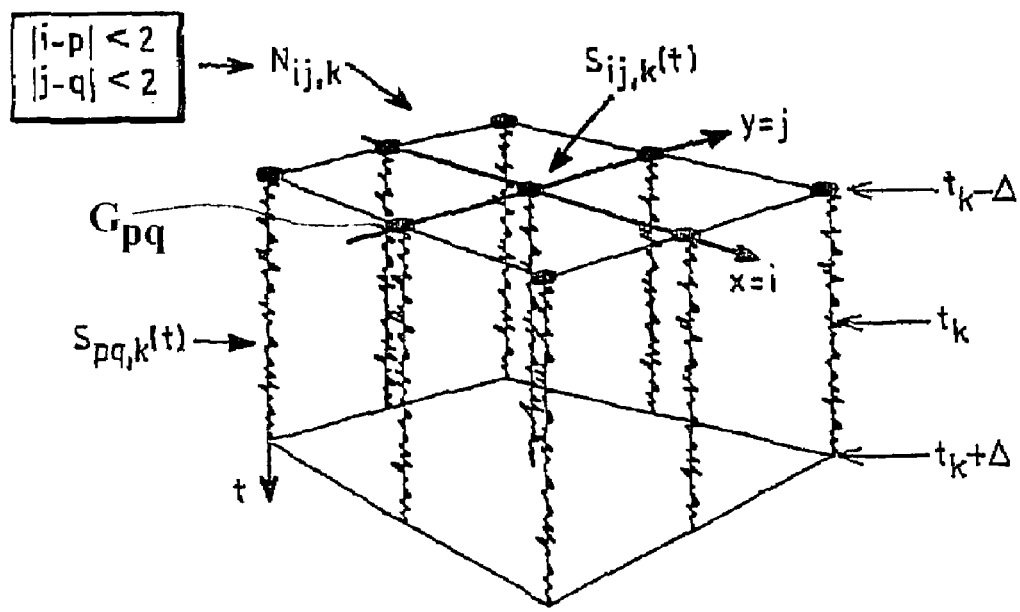
FIG. 2 represents schematically an example of local neighborhood $N_{ij,k}$ consisting of a set of continuous local seismic traces $S_{pq,k}(t)$ adajcent the central reference trace $S_{ij,k}(t)$ itself located on the vertical of the geophone $G_{ij}$ and interpolating the seismic amplitudes about t=k.

In FIG. 2, several continuous local seismic traces define an example of neighborhood of a "central" continuous local seismic trace $S_{ij,k}(t)$ as a reference. The neighborhood of a continuous local seismic trace $S_{ij,k}(t)$ is defined as the set of continuous local seismic traces whose horizontal spatial indices p,q are adjacent horizontal spatial indices i,j of the reference continuous local seismic trace.

By way of example, the horizontal spatial coordinates p,q corresponding to the geophone $G_{pq}$ are adjacent horizontal spatial coordinates i, j corresponding to the geophone $G_{ij}$ if the absolute values of the differences i−p and j−q are less than given whole numbers, for example 2.

In this case, as shown in FIG. 2, the continuous local seismic trace $S_{ij,k}(t)$ is associated with eight adjacent continuous local seismic traces surrounding the "central" continuous local seismic trace $S_{ij,k}(t)$.

In the case of continuous local seismic traces produced by seismic measurements, the shape of the geological horizons introduces vertical offsets between adjacent continuous local seismic traces. So as to determine the relationships between two adjacent local continuous seismic traces $S_{ij,k}(t)$ and $S_{pq,k}(t)$ centered on the same vertical sampling coordinate $t=t_k=k$ and corresponding to different spatial coordinates i,j and p,q, there can be calculated the correlation function $R_{ij,pq,k}(h)$ of the two continuous local seismic traces.

The correlation function of two adjacent continuous local seismic traces is obtained by the following formula $$R_{ij,pq,k}(h) = \frac{C_{ij,pq,k}(h)}{\sqrt{C_{ij,ij,k}(0), C_{pq,pq,k}(0)}}$$

in which the numerator corresponds to the covariance function of $S_{ij,k}(t)$ and $S_{pq,k}(t)$ obtained by the following expression $$C_{ij,pq,k}(h) = \int_{tk-\Delta}^{tk+\Delta} S_{ij,k}(t) \cdot S_{pq,k}(t+h) \cdot dt.$$

In this integral defining $C_{ij,pq,k}(h)$, the parameter $\Delta$ defines a "vertical investigation window" about $t=t_k=k$.

For example, if the continuous local seismic traces $S_{ij,k}(t)$ and $S_{pq,k}(t)$ are trigonometric polynomials of the following form, interpolating seismic data $$S_{ij,k}(t) = \sum_{s=1}^{m} a_s^{ij,k}, \cos(s\omega t) + b_s^{ij,k}, \sin(s\omega t)$$

$$S_{ij,k}(t) = \sum_{s=1}^{m} a_s^{ij,k}, \cos(s\omega t) + b_s^{ij,k}, \sin(s\omega t)$$

then it can be shown that the covariance function $C_{ij,pq,k}(h)$ is itself a trigonometric polynomial of the following form in which the coefficients $A_s^{ij,pq,k}$ and $B_s^{ij,pq,k}$ depend on the coefficients $a_s^{ij,k}$, $a_s^{pq,k}$ and $b_s^{pq,k}$:

$$C_{ij,pq,k}(h) = \sum_{s=1}^{m} A_s^{ij,pq,k}, \cos(s\omega h) + B_s^{ij,pq,k}, \sin(s\omega h)$$

A conventional and known mathematical result is that the correlation function $$R_{ij,pq,k}(h) = \frac{C_{ij,pq,k}}{\sqrt{C_{ij,ij,k}(0) \cdot C_{pq,pq,k}(0)}}$$

translates a similarity of correlated functions when this correlation function is near 1.

The study of the correlation functions of the continuous local seismic traces $S_{ij,k}(t)$ and $S_{pq,k}(t)$ permits defining as optimum offset the value $h_{ij,pq,k}$ of h corresponding to the maximum of the correlation function $R_{ij,pq,k}(h)$, which is to say to the maximum of the correlation function nearest 1. Contrary to the existing art based on a discrete formulation of the correlation function $R_{ij,pq,k}(h)$, the use of a continuous formulation of the seismic traces and hence of the correlation function permits obtaining optimum offset which is not necessarily a whole multiple of the sampling step along the vertical axis corresponding to the variable t.

Figure 3:
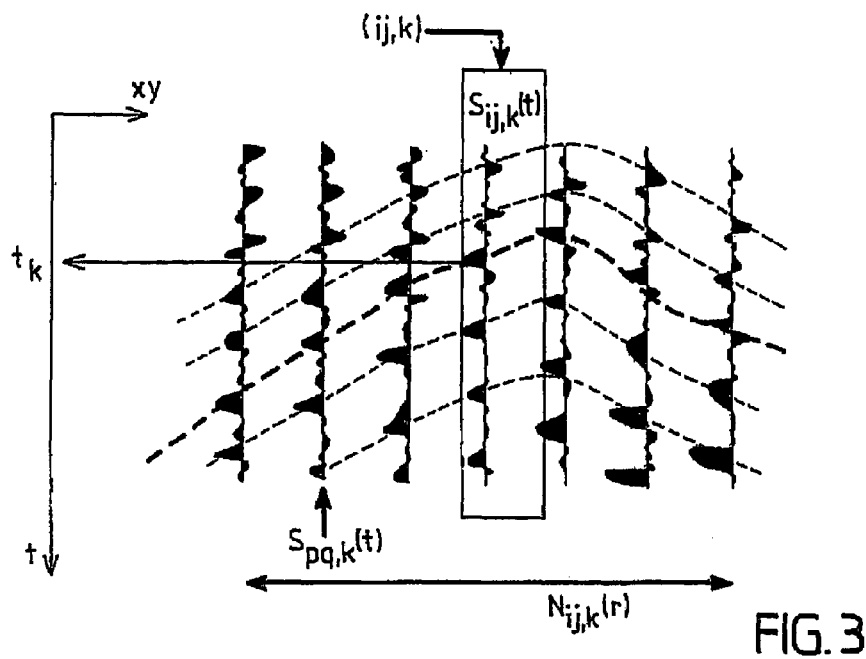
FIG. 3 represents schematically a vertical cross-section of conditional local neighborhood $N_{ij,k}(r)$ of a continuous reference local seismic trace $S_{ij,k}(t)$.
Figure 4:
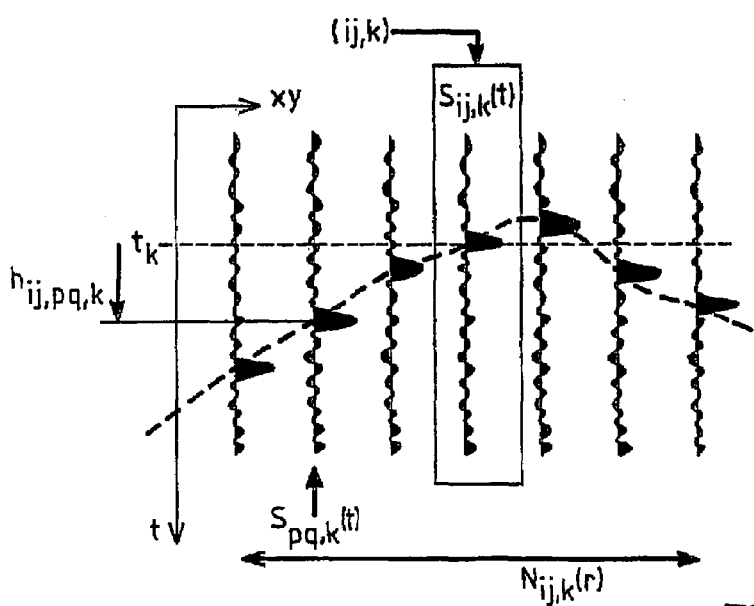
FIG. 4 shows schematically a vertical cross-section of a three-dimensional seismic matrix with optimum offset $h_{ij,pq,k}$ and a conditional neighborhood $N_{ij,k}(r)$.
Figure 5:
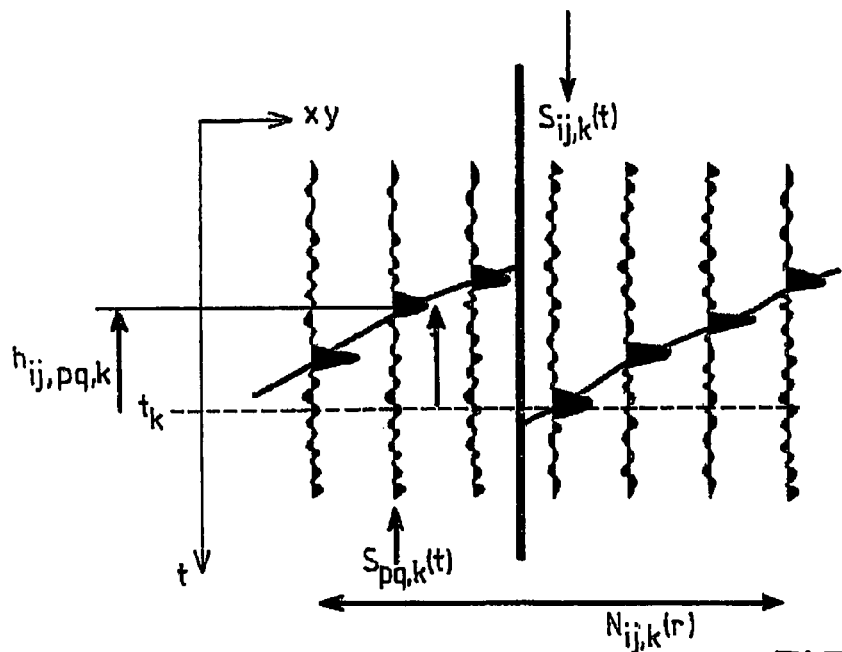
FIG. 5 represents schematically a vertical cross-section of a three-dimensional seismic matrix analogous to FIG. 4, with the presence of a fault or discontinuity.

The definition of the optimum offset $h_{ij,pq,k}$ of two adjacent continuous local seismic traces permits obtaining a first approximation of the horizons passing through this reference continuous local seismic trace $S_{ij,k}(t)$, as shown in FIGS. 3 to 5. Contrary to the prior art, the fact of using optimum offsets which are not required to be a whole multiple of the sampling interval along the vertical axis, permits avoiding errors known as "aliasing".

In these FIGS. 3 to 5, there is defined a conditional neighborhood $N_{ij,k}(r)$ of the reference local continuous seismic trace $S_{ij,k}(t)$ which is a sub-neighborhood of the initial neighborhood of the continuous local seismic traces used in the computation of correlation and of definition of the optimum offsets. The conditional neighborhood $N^{ij,k}(r)$ is selected such that, for any local continuous seismic trace $S_{pq,k}(t)$ belonging to $N_{ij,k}(r)$, the corresponding optimum offset $h_{ij,pq,k}$ is such that the correlation $R_{ij,pq,k}(h_{ij,pq,k})$ between $S_{ij,k}(t)$ and $S_{pq,k}(t)$ is greater than a predetermined threshold r comprised between 0 and 1.

As is seen in FIG. 5, the fixing of the threshold r also permits including in a conditional neighborhood a geological discontinuity or halt which constitutes an important advantage relative to the prior art.

The mentioned arrangements thus provide a continuous modelization permitting use of the invention.

Figure 6:
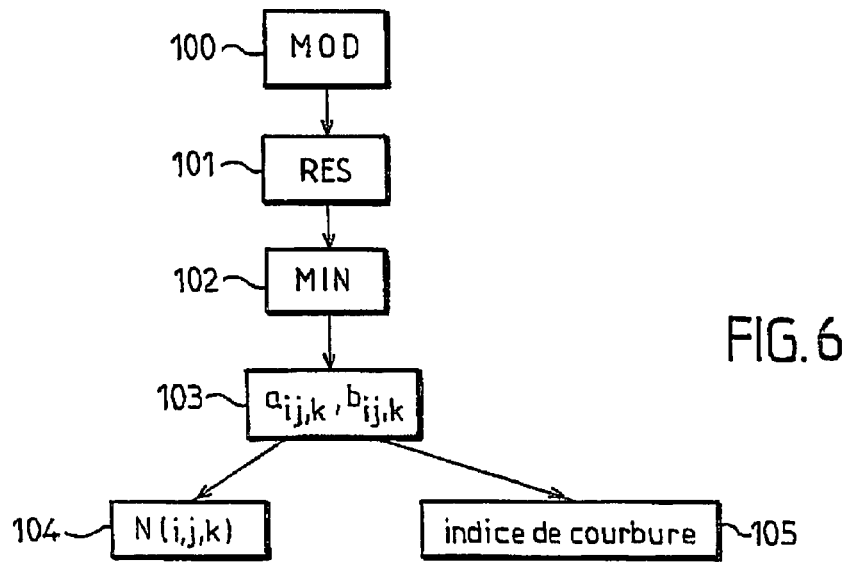
FIG. 6 represents schematically a functional diagram of a process according to the invention.
Figure 7:
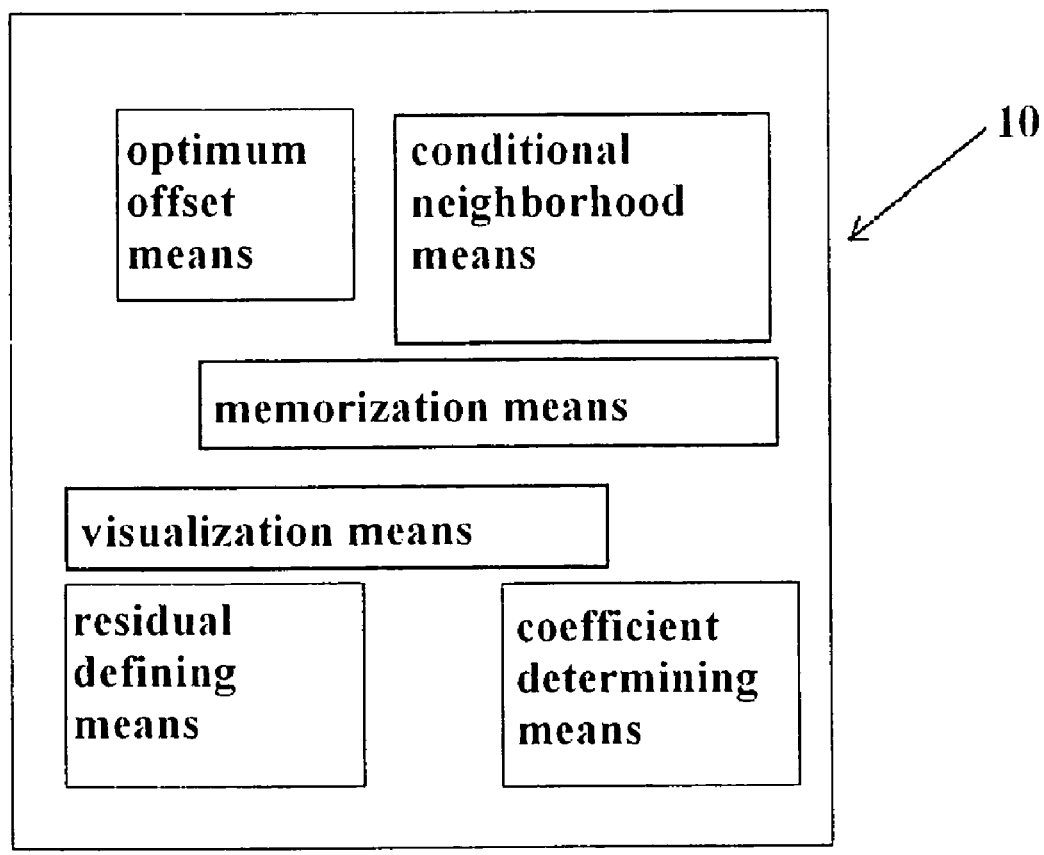
FIG. 7 represents a block diagram of the device according to the invention.

In FIG. 6, the digital modelization described in reference to FIGS. 1 to 5 is carried out in step 100 to use a process according to the invention.

After this step 100 of digital modeling, there is defined in step 101, for each continuous local seismic trace $S_{pq,k}(t)$ of the conditional neighborhood $N_{ij,k}(r)$, a value of residual relative to said reference central continuous local seismic trace $S_{ij,k}(t)$ comprising parametric coefficients.

The value of the selected residual $\rho_{ij,pq,k}$ translates the variation between the horizon at the vertical of the geophone $G_{pq}$ and the plane tangent to the horizon at the vertical of the geophone $G_{ij}$.

Figure 8:
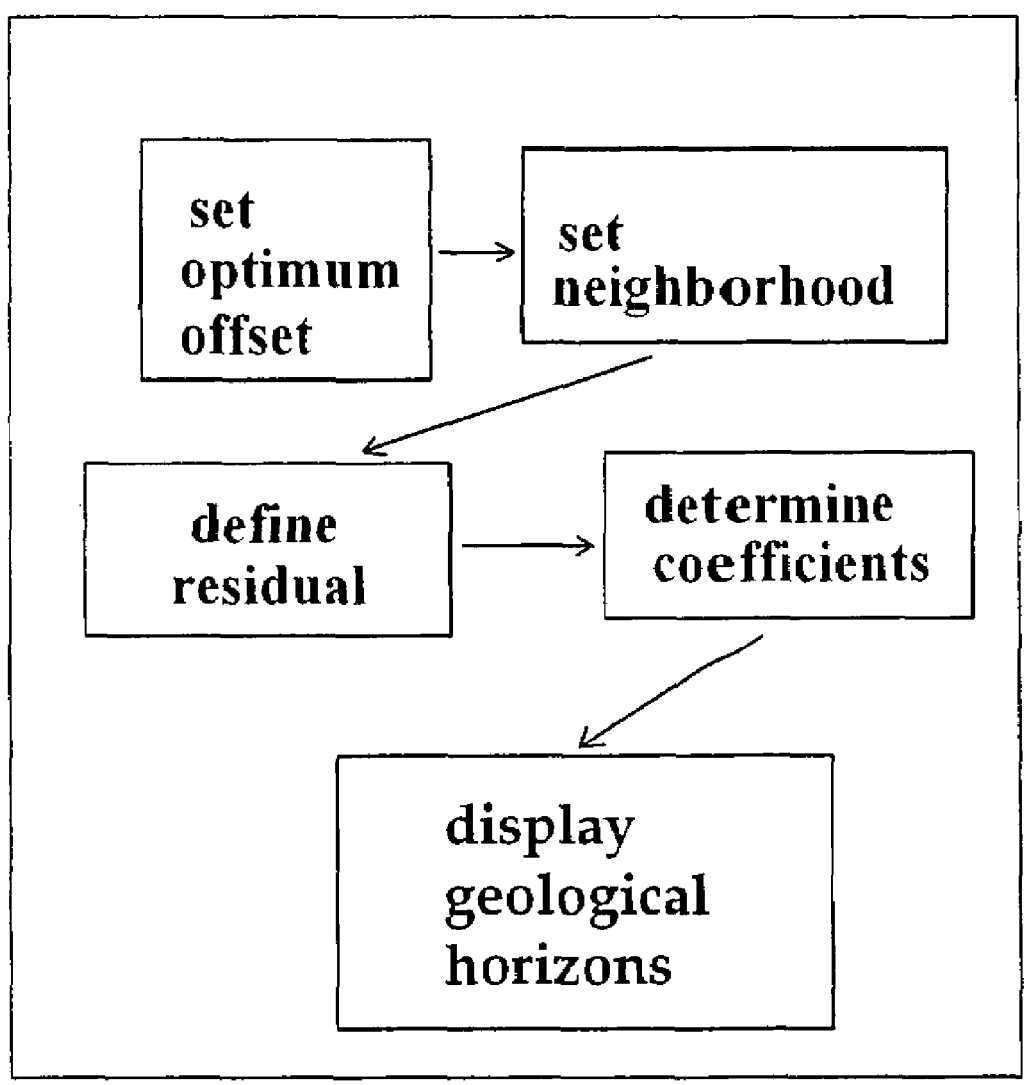
FIG. 8 represents a flowchart setting forth the steps according to the invention.

By way of non-limiting example and with respect to FIG. 8, there can be defined as the residual value an absolute value of differential parametric shape, of the type:

$\rho_{ij,pq,k} = |a_{ij,k} \cdot (p-i) + b_{ij,k} \cdot (q-j) - h_{ij,pq,k}|$, in which $a_{ij,k}$ and $b_{ij,k}$ are parameters and $h_{ij,pq,k}$ is the optimum offset maintained between the "central" continuous local seismic trace $S_{ij,k}(t)$ and an adjacent continuous local seismic trace $S_{pq,k}(t)$.

After having defined the set of residuals on the conditional neighborhood $N_{ij,k}(r)$, there are determined the parameters $a_{ij,k}$ and $b_{ij,k}$ which correspond to a minimization of the set of residuals $\rho_{ij,pq,k}$ on the conditional neighborhood in step 102.

The criteria of minimization selected is arbitrary, and can for example comprise a minimization of a sum of power greater than 1 of the residuals, of the form $$C^\alpha(i, j, k) = \sum_{p,q} (\rho_{ij,pq,k})^\alpha,$$

in which n is a real positive power greater than 1.

As the case may be, each term $(\rho_{ij,pq,k})^\alpha$ of this sum can be weighted by an increasing functional factor of the coefficient of correlation $P_{ij,pq,k}(h_{ij,pq,k})$.

The minimization carried out in step 102 produces as a result in step 103 the best estimation of the coefficients $a_{ij,k}$ and $b_{ij,k}$ which are directing coefficients of the horizon passing through the point of horizontal coordinates i,j and of the time coordinate or depth coordinate k.

In step 104, according to a first modification of the invention, there are determined the unitary vectors normal to the horizon passing through the spatial coordinate i, j and time coordinate or depth coordinate k by formulae of known type:

$$N^x(i, j, k) = \frac{a_{ij,k}}{\sqrt{(a_{ij,k})^2 + (b_{ij,k})^2 + 1}}$$

$$N^y(i, j, k) = \frac{b_{ij,k}}{\sqrt{(a_{ij,k})^2 + (b_{ij,k})^2 + 1}}$$

$$N^t(i, j, k) = \frac{1}{\sqrt{(a_{ij,k})^2 + (b_{ij,k})^2 - 1}}$$

The normal unitary vector thus obtained or any vector which is parallel to it, permits a visualization which is more effective than the visualizations of the prior art, so as to give seismic parameters and profiles of geometric horizons with improved contrast relative to the prior art.

For another modification of the invention in step 105, there is selected as the index of horizon curvature at the point of spatial coordinates i, j and of the time coordinate or depth coordinate k, an increasing function of the residuals comprising the coefficients $a_{ij,k}$ and $b_{ij,k}$ determined in step 103.

There can particularly be used as the indicator or index of curvature the minimization criterion $$C^\alpha(i, j, k) = \sum_{p,q} (\rho_{ij,pq,k})^\alpha,$$

used to compute the parametric coefficients $a_{ij,k}$ and $b_{ij,k}$ determined in step 103.

There can also be used without departing from the scope of the present invention, any other increasing function of the residuals on the conditional neighborhood $N_{ij,k}(r)$.

Thus, in the case in which the horizon is perfectly flat in the neighborhood or point of spatial coordinates i,j and of time or depth coordinate k, all increasing functions of the residuals will be equal to zero and the local index of curvature will as a result also be zero.

On the contrary, in the case in which the horizon at the point of spatial coordinates i,j and of time or depth coordinate k is not flat, the index of curvature calculated in step 105 of the process according to the invention provides an indication or measurement of the difference between the horizon in question and the locally osculating plane at the point of spatial coordinates i,j and of time or depth coordinate k.

The invention also permits by the computation of the index of curvature and its graphical representation on a screen, to improve the contrast of the seismic measurements provided by geophones in the form of a three-dimensional seismic matrix and thereby to avoid additional seismic measurements in the region of geological discontinuities or faults.

A device 10 for practicing a process according to the invention includes means to use as optimum offset of two adjacent continuous local seismic traces, the value of offset rendering maximum their correlation function, means to take as conditional neighborhood of a "central" continuous local seismic trace $S_{ij,k}(t)$ the sub-neighborhood consisting in adjacent traces $S_{pq,k}(t)$ corresponding to optimum offsets associated with correlations $R_{ij,pq,k}(h)$ greater than a predetermined threshold comprised between 0 and 1, means to define for each continuous local seismic trace $S_{pq,k}(t)$ of the conditional neighborhood a value of residual relative to said "central" continuous local seismic trace $S_{ij,k}(t)$ comprising parametric coefficients, and means to determine the parametric coefficients by minimization of the set of residuals on the conditional neighborhood.

The preferred practice of a process according to the invention consists in using a device for the practice of the process containing a computer software package executing the steps of the process according to the invention described with reference to FIGS. 1 to 6.

To this end, the device according to the invention is provided with suitable memorizing means to memorize and compute the successive elements used in the process according to the invention.

Preferably, the practice of the process according to the invention takes place at a work station for seismic computations by loading a software package according to the invention comprising elements of program code to execute the steps of the process according to the invention.

The software package can comprise program code elements relating to steps 100, 101, 102, 103 and 104 described with reference to FIG. 6.

Alternatively, the software package according to the invention can comprise program codes elements to execute steps 100, 101, 102, 103 and 105 described with reference to FIG. 6.

According to other modifications, a computer software package according to the invention can also comprise program code elements to execute at least the set of process steps described with reference to FIG. 6.

The invention described with reference to several embodiments is in no way thus limited, but covers on the contrary any modification of form and all variations of practice, including or not the presentation of intermediate results on a visualization screen.

The invention claimed is:

1. Process to determine locally the shape of geological horizons, in which there is constructed a continuous function $S_{ij,k}(t)$ by interpolation or approximation of the discrete seismic traces of a three-dimensional seismic matrix, said $S_{ij,k}(t)$'s function being designated as a "continuous local seismic trace", comprising the following steps:
   a). using as optimum offset of two adjacent continuous local seismic traces, the value of offset rendering maximal their correlation function, with optimal offset not being necessarily a whole multiple of the vertical sampling interval;
   b). taking as conditional neighborhood of a "central" continuous local seismic trace $S_{ij,k}(t)$ the sub-neighborhood consisting in adjacent traces $S_{pq,k}(t)$ corresponding to optimum offsets $h_{ij,pq,k}$ associated with correlations $R_{ij,pq,k}(h_{ij,pq,k})$ greater than a predetermined threshold comprised between 0 and 1;
   c). defining for each continuous local seismic trace $S_{pq,k}(t)$ of the conditional neighborhood, a value of residual relative to said "central" continuous local seismic trace $S_{ij,k}(t)$ comprising parametric coefficients;
   d). determining the parametric coefficients $a_{ij,k}$ and $b_{ij,k}$ by minimization of a set of residuals on the conditional neighborhood; and
   e) displaying geological horizons determined based on the parametric coefficients $a_{ij,k}$ and $b_{ij,k}$.

2. Process according to claim 1, in which the residual values of step c) are absolute values of parametric differential having the form $|a_{ij,k}(p-i)+b_{ij,k}(q-j)-h_{ij,kpq,k}|$, in which $a_{ij,k}$ and $b_{ij,k}$ are parameters and $h_{ij,pq,k}$ is the optimum offset maintained between the "central" continuous local seismic trace $S_{ij,k}(t)$ and an adjacent continuous local seismic trace $S_{pq,k}(t)$.

3. Process according to claim 2, in which the minimization of the assembly of residuals $\rho_{ij,pq,k}$ on the conditional neighborhood comprises a minimization of a sum of powers of the residuals, of the form $$C^{\alpha}(i, j, k) = \sum_{p,q} (\rho_{ij,pq,k})^{\alpha},$$

in which $\alpha$ is a power greater than 1.

4. Process according to claim 2, in which there is selected as the index of curvature an increase in function of the residuals comprising the parametric coefficients determined in step d).

5. Process according to claim 1, in which the minimization of the assembly of residuals $\rho_{ij,pq,k}$ on the conditional neighborhood comprises a minimization of a sum of powers of the residuals, of the form $$C^{\alpha}(i, j, k) = \sum_{p,q} (\rho_{ij,pq,k})^{\alpha},$$

in which $\alpha$ is a power greater than 1.

6. Process according to claim 5, in which there is selected as the index of curvature an increase in function of the residuals comprising the parametric coefficients determined in step d).

7. Process according to claim 1, in which the coefficients $a_{ij,k}$ and $b_{ij,k}$ determined in step b) are used to define a unitary vector $N(i,j,k)$ of coordinates $N^X(i,j,k)$, $N^Y(i,j,k)$, $N^t(i,j,k)$, having the form:

$$N^x(i, j, k) = \frac{a_{ij,k}}{\sqrt{(a_{ij,k})^2 + (b_{ij,k})^2 + 1}}$$

$$N^y(i, j, k) = \frac{b_{ij,k}}{\sqrt{(a_{ij,k})^2 + (b_{ij,k})^2 + 1}}$$

-continued $$N^t(i, j, k) = \frac{1}{\sqrt{(a_{ij,k})^2 + (b_{ij,k})^2 - 1}}$$

and in which there is selected this unitary vector as normal unitary vector (orthogonal) to the horizon of the node (i, j, k).

8. Process according to claim 7, in which there is used the set of normal unitary vectors N(i, j, k) to define the field of the normal unitary vectors, for the display on a screen of the seismic horizon profiles.

9. Process according to claim 1, in which there is selected as the index of curvature an increase in function of the residuals comprising the parametric coefficients determined in step d).

10. A device for determining locally the shape of geological horizons, in which there is constructed a continuous function $S_{ij,k}(t)$ by interpolation or approximation of the discrete seismic traces of a three-dimensional seismic matrix, said $S_{ij,k}(t)$'s function being designated as a "continuous local seismic trace", comprising:

means to use as optimum offset of two adjacent continuous local seismic traces, the value of offset rendering maximum their correlation function, means to take as conditional neighborhood of a "central" continuous local seismic trace $S_{ij,k}(t)$ the sub-neighborhood consisting in adjacent traces $S_{pq,k}(t)$ corresponding to optimum offsets associated with correlations $R_{ij,pq,k}(h)$ greater than a predetermined threshold comprised between 0 and 1, means to define for each continuous local seismic trace $S_{pq,k}(t)$ of the conditional neighborhood a value of residual relative to said "central" continuous local seismic trace $S_{ij,k}(t)$ comprising parametric coefficients, means to determine the parametric coefficients by minimization of the set of residuals on the conditional neighborhood, and means to display geological horizons determined based on the parametric coefficients.

11. Device according to claim 10, further comprising memorization means and visualization means of seismic parameters determined using a process to determine locally the shape of geological horizons.

12. A computer-readable medium encoded with a computer software package to determine locally the shape of geological horizons, comprising program code elements to carry out the steps of:

a). using as optimum offset of two adjacent continuous local seismic traces, the value of offset rendering maximal their correlation function, with optimal offset not being necessarily a whole multiple of the vertical sampling interval;

b). taking as conditional neighborhood of a "central" continuous local seismic trace $S_{ij,k}(t)$ the sub-neighborhood consisting in adjacent traces $S_{pq,k}(t)$ corresponding to optimum offsets $h_{ij,pq,k}$ associated with correlations $R_{ij,pq,k}(h_{ij,pq,k})$ greater than a predetermined threshold comprised between 0 and 1;

c). defining for each continuous local seismic trace $S_{pq,k}(t)$ of the conditional neighborhood, a value of residual relative to said "central" continuous local seismic trace $S_{ij,k}(t)$ comprising parametric coefficients;

d). determining the parametric coefficients $a_{ij,k}$ and $b_{ij,k}$ by minimization of a set of residuals on the conditional neighborhood, when said program is executed by a computer; and e) displaying geological horizons determined based on the parametric coefficients $a_{ij,k}$ and $b_{ij,k}$.

13. The computer-readable medium encoded with a computer software package as claimed in claim 12, comprising elements of program code to carry out the steps of taking as conditional neighborhood of a "central" continuous local seismic trace $S_{ij,k}(t)$ the sub-neighborhood consisting in adjacent traces $S_{pq,k}(t)$ corresponding to optimum offsets $h_{ij,pq,k}$ associated with correlations $R_{ij,pg,k}(h_{ij,pq,k})$ greater than a predetermined threshold comprised between 0 and 1, in which there is selected as the index of curvature an increase in function of the residuals comprising the parametric coefficients determined in step d), when said program is executed by a computer.

14. A device for determining locally the shape of geological horizons, in which there is constructed a continuous function $S_{ij,k}(t)$ by interpolation or approximation of the discrete seismic traces of a three-dimensional seismic matrix, said $S_{ij,k}(t)$'s function being designated as a "continuous local seismic trace", comprising:

means to use as optimum offset of two adjacent continuous local seismic traces, the value of offset rendering maximum their correlation function, means to take as conditional neighborhood of a "central" continuous local seismic trace $S_{ij,k}(t)$ the sub-neighborhood consisting in adjacent traces $S_{pq,k}(t)$ corresponding to optimum offsets associated with correlations $R_{ij,pq,k}(h)$ greater than a predetermined threshold comprised between 0 and 1, means to define for each continuous local seismic trace $S_{pq,k}(t)$ of the conditional neighborhood a value of residual relative to said "central" continuous local seismic trace $S_{ij,k}(t)$ comprising parametric coefficients, means to determine the parametric coefficients by minimization of the set of residuals on the conditional neighborhood, and means to display geological horizons determined based on the parametric coefficients, wherein the absolute values of parametric differential having the form $|a_{ij,k}(p-i)+b_{ij,k}(q-j)-h_{ij,pq,k}|$, in which $a_{ij,k}$ and $b_{ij,k}$ are parameters and $h_{ij,pq,k}$ is the optimum offset maintained between the "central" continuous local seismic trace $S_{ij,k}(t)$ and an adjacent continuous local seismic trace $S_{pq,k}(t)$.

15. Device for determining locally the shape of geological horizons, in which there is constructed a continuous function $S_{ij,k}(t)$ by interpolation or approximation of the discrete seismic traces of a three-dimensional seismic matrix, said $S_{ij,k}(t)$'s function being designated as a "continuous local seismic trace", comprising:

means to use as optimum offset of two adjacent continuous local seismic traces, the value of offset rendering maximum their correlation function, means to take as conditional neighborhood of a "central" continuous local seismic trace $S_{ij,k}(t)$ the sub-neighborhood consisting in adjacent traces $S_{pq,k}(t)$ corresponding to optimum offsets associated with correlations $R_{ij,pq,k}(h)$ greater than a predetermined threshold comprised between 0 and 1, means to define for each continuous local seismic trace $S_{pq,k}(t)$ of the conditional neighborhood a value of residual relative to said "central" continuous local seismic trace $S_{ij,k}(t)$ comprising parametric coefficients, means to determine the parametric coefficients by minimization of the set of residuals on the conditional neighborhood, and means to display geological horizons determined based on the parametric coefficients, wherein the minimization of the assembly of residuals $\rho_{ij,pq,k}$ on the conditional neighborhood comprises a minimization of a sum of powers of the residuals, of the form $$C^\alpha(i, j, k) = \sum_{p,q} (\rho_{ij,pq,k})^\alpha,$$

in which $\alpha$ is a power greater than 1.

16. A device for determining locally the shape of geological horizons, in which there is constructed a continuous function $S_{ij,k}(t)$ by interpolation or approximation of the discrete seismic traces of a three-dimensional seismic matrix, said $S_{ij,k}(t)$'s function being designated as a "continuous local seismic trace", comprising:

means to use as optimum offset of two adjacent continuous local seismic traces, the value of offset rendering maximum their correlation function, means to take as conditional neighborhood of a "central" continuous local seismic trace $S_{ij,k}(t)$ the sub-neighborhood consisting in adjacent traces $S_{pq,k}(t)$ corresponding to optimum offsets associated with correlations $R_{ij,pq,k}(h)$ greater than a predetermined threshold comprised between 0 and 1, neighborhood means to define for each continuous local seismic trace $S_{pq,k}(t)$ of the conditional neighborhood a value of residual relative to said "central" continuous local seismic trace $S_{ij,k}(t)$ comprising parametric coefficients, means to determine the parametric coefficients by minimization of the set of residuals on the conditional neighborhood, and means to display geological horizons determined based on the parametric coefficients, in which the coefficients $a_{ij,k}$ and $b_{ij,k}$ determined in step b) are used to define a unitary vector $N(i,j,k)$ of coordinates $N^x(i,j,k)$, $N^y(i,j,k)$, $N^t(i,j,k)$, for example of the form:

$$N^x(i, j, k) = \frac{a_{ij,k}}{\sqrt{(a_{ij,k})^2 + (b_{ij,k})^2 + 1}}$$

$$N^y(i, j, k) = \frac{b_{ij,k}}{\sqrt{(a_{ij,k})^2 + (b_{ij,k})^2 + 1}}$$

$$N^t(i, j, k) = \frac{1}{\sqrt{(a_{ij,k})^2 + (b_{ij,k})^2 - 1}}$$

and in which there is selected this unitary vector as normal unitary vector (orthogonal) to the horizon of the node (i, j, k).

17. A computer-readable medium encoded with a computer software package to determine locally the shape of geological horizons, comprising program code elements to carry out the steps of:

a). using as optimum offset of two adjacent continuous local seismic traces, the value of offset rendering maximal their correlation function, with optimal offset not being necessarily a whole multiple of the vertical sampling interval;

b). taking as conditional neighborhood of a "central" continuous local seismic trace $S_{ij,k}(t)$ the sub-neighborhood consisting in adjacent traces $S_{pq,k}(t)$ corresponding to optimum offsets $h_{ij,pq,k}$ associated with correlations $R_{ij,pq,k}(h_{ij,pq,k})$ greater than a predetermined threshold comprised between 0 and 1;

c). defining for each continuous local seismic trace $S_{pq,k}(t)$ of the conditional neighborhood, a value of residual relative to said "central" continuous local seismic trace $S_{ij,k}(t)$ comprising parametric coefficients;

d). determining the parametric coefficients $a_{ij,k}$ and $b_{ij,k}$ by minimization of a set of residuals on the conditional neighborhood, when said program is executed by a computer, and e) displaying geological horizons determined based on the parametric coefficients $a_{ij,k}$ and $b_{ij,k}$, wherein the residual values of step c) are absolute values of parametric differential having the form $|a_{ij,k}(p-i) + b_{ij,k}(q-j) - h_{ij,k,pq,k}|$, in which $a_{ij,k}$ and $b_{ij,k}$ are parameters and $h_{ij,pq,k}$ is the optimum offset maintained between the "central" continuous local seismic trace $S_{ij,k}(t)$ and an adjacent continuous local seismic trace $S_{pq,k}(t)$.

18. A computer-readable medium encoded with a computer software package to determine locally the shape of geological horizons, comprising program code elements to carry out the steps of:

a). using as optimum offset of two adjacent continuous local seismic traces, the value of offset rendering maximal their correlation function, with optimal offset not being necessarily a whole multiple of the vertical sampling interval;

b). taking as conditional neighborhood of a "central" continuous local seismic trace $S_{ij,k}(t)$ the sub-neighborhood consisting in adjacent traces $S_{pq,k}(t)$ corresponding to optimum offsets $h_{ij,pq,k}$ associated with correlations $R_{ij,pq,k}(h_{ij,pq,k})$ greater than a predetermined threshold comprised between 0 and 1;

c). defining for each continuous local seismic trace $S_{pq,k}(t)$ of the conditional neighborhood, a value of residual relative to said "central" continuous local seismic trace $S_{ij,k}(t)$ comprising parametric coefficients;

d). determining the parametric coefficients $a_{ij,k}$ and $b_{ij,k}$ by minimization of a set of residuals on the conditional neighborhood, when said program is executed by a computer, and e) displaying geological horizons determined based on the parametric coefficients $a_{ij,k}$ and $b_{ij,k}$, wherein the minimization of the assembly of residuals $\rho_{ij,pq,k}$ on the conditional neighborhood comprises a minimization of a sum of powers of the residuals, of the form $$C^\alpha(i, j, k) = \sum_{p,q} (\rho_{ij,pq,k})^\alpha,$$

in which $\alpha$ is a power greater than 1.

19. A computer-readable medium encoded with a computer software package to determine locally the shape of geological horizons, comprising program code elements to carry out the steps of:

a). using as optimum offset of two adjacent continuous local seismic traces, the value of offset rendering maximal their correlation function, with optimal offset not being necessarily a whole multiple of the vertical sampling interval;

b). taking as conditional neighborhood of a "central" continuous local seismic trace $S_{ij,k}(t)$ the sub-neighborhood consisting in adjacent traces $S_{pq,k}(t)$ corresponding to optimum offsets $h_{ij,pq,k}$ associated with correlations $R_{ij,pq,k}(h_{ij,pq,k})$ greater than a predetermined threshold comprised between 0 and 1;

c). defining for each continuous local seismic trace $S_{pq,k}(t)$ of the conditional neighborhood, a value of residual relative to said "central" continuous local seismic trace $S_{ij,k}(t)$ comprising parametric coefficients;

d). determining the parametric coefficients $a_{ij,k}$ and $b_{ij,k}$ by minimization of a set of residuals on the conditional neighborhood, when said program is executed by a computer, and e) displaying geological horizons determined based on the parametric coefficients $a_{ij,k}$ and $b_{ij,k}$, wherein the coefficients $a_{ij,k}$ and $b_{ij,k}$ determined in step b) are used to define a unitary vector N(i,j,k) of coordinates $N^x(i,j,k)$, $N^y(i,j,k)$, $N^t(i,j,k)$, for example of the form:

$$N^x(i, j, k) = \frac{a_{ij,k}}{\sqrt{(a_{ij,k})^2 + (b_{ij,k})^2 + 1}}$$

$$N^y(i, j, k) = \frac{b_{ij,k}}{\sqrt{(a_{ij,k})^2 + (b_{ij,k})^2 + 1}}$$

$$N^t(i, j, k) = \frac{1}{\sqrt{(a_{ij,k})^2 + (b_{ij,k})^2 - 1}}$$

and in which there is selected this unitary vector as normal unitary vector (orthogonal) to the horizon of the node (i, j, k).

20. A computer-readable medium encoded with a computer software package to determine locally the shape of geological horizons, comprising program code elements to carry out the steps of:

a). using as optimum offset of two adjacent continuous local seismic traces, the value of offset rendering maximal their correlation function, with optimal offset not being necessarily a whole multiple of the vertical sampling interval;

b). taking as conditional neighborhood of a "central" continuous local seismic trace $S_{ij,k}(t)$ the sub-neighborhood consisting in adjacent traces $S_{pq,k}(t)$ corresponding to optimum offsets $h_{ij,pq,k}$ associated with correlations $R_{ij,pq,k}(h_{ij,pq,k})$ greater than a predetermined threshold comprised between 0 and 1;

c). defining for each continuous local seismic trace $S_{pq,k}(t)$ of the conditional neighborhood, a value of residual relative to said "central" continuous local seismic trace $S_{ij,k}(t)$ comprising parametric coefficients;

d). determining the parametric coefficients $a_{ij,k}$ and $b_{ij,k}$ by minimization of a set of residuals on the conditional neighborhood, when said program is executed by a computer, and e) displaying geological horizons determined based on the parametric coefficients $a_{ij,k}$ and $b_{ijk}$, wherein the coefficients $a_{ij,k}$ and $b_{ij,k}$ determined in step b) are used to define a unitary vector N(i,j,k) of coordinates $N^x(i,j,k)$, $N^y(i,j,k)$, $N^t(i,j,k)$, for example of the form:

$$N^x(i, j, k) = \frac{a_{ij,k}}{\sqrt{(a_{ij,k})^2 + (b_{ij,k})^2 + 1}}$$

$$N^y(i, j, k) = \frac{b_{ij,k}}{\sqrt{(a_{ij,k})^2 + (b_{ij,k})^2 + 1}}$$

$$N^t(i, j, k) = \frac{1}{\sqrt{(a_{ij,k})^2 + (b_{ij,k})^2 - 1}}$$

and in which there is selected this unitary vector as normal unitary vector (orthogonal) to the horizon of the node (i, j, k); and wherein there is used the set of normal unitary vectors N(i, j, k) to define the field of the normal unitary vectors, for the display on a screen of the seismic horizon profiles.

* * * * *